United States Patent [19]

Kelly

[11] Patent Number: 5,430,127
[45] Date of Patent: Jul. 4, 1995

[54] PROCESS FOR MINIMIZING RESIDUAL MONOMERS

[75] Inventor: Paul Kelly, Simpsonville, S.C.

[73] Assignee: National Starch and Chemical Investment Holding Corporation, Wilmington, Del.

[21] Appl. No.: 146,687

[22] Filed: Nov. 2, 1993

[51] Int. Cl.⁶ .................. C08F 6/10; C08G 63/88; C08J 3/03
[52] U.S. Cl. .................. 528/500; 523/307; 523/309; 523/326; 523/328; 523/343
[58] Field of Search ............. 528/500; 523/307, 309, 523/328, 326, 343; 524/800, 803

[56] References Cited

U.S. PATENT DOCUMENTS

| | | | |
|---|---|---|---|
| 3,380,851 | 4/1968 | Lindemann et al. | 117/140 |
| 3,404,112 | 10/1968 | Lindemann et al. | 260/29.6 |
| 3,454,542 | 8/1968 | Cheape, Jr. et al. | 260/85.5 |
| 3,708,388 | 1/1973 | Lindemann et al. | 161/247 |
| 4,164,489 | 8/1979 | Daniels et al. | 260/29.6 R |
| 4,529,753 | 7/1985 | Taylor | 523/328 |
| 5,268,437 | 12/1993 | Holy et al. | 526/229 |

*Primary Examiner*—Paul R. Michl
*Assistant Examiner*—U. K. Rajguru
*Attorney, Agent, or Firm*—Ellen T. Dec

[57] ABSTRACT

Aqueous emulsions, at least 80% of which have been polymerized, are treated by a process which comprises the separate steps of: a) initially treating the emulsion with a sufficient amount of a free radical generator in an amount and for a time sufficient to reduce the residual monomer content to from about 1500 to about 6000 part per million, and b) subsequently subjecting the emulsion to steam stripping under vacuum, without significantly degrading or destabilizing the emulsion, to thereby reduce the residual monomer content to from about 5 to about 500 parts per million.

5 Claims, No Drawings

PROCESS FOR MINIMIZING RESIDUAL MONOMERS

FIELD OF THE INVENTION

The present invention relates to a process for minimizing residual monomer in aqueous polymeric emulsions.

BACKGROUND OF THE INVENTION

Aqueous emulsion polymerization systems are well known for the production of many types of polymers, for example, the preparation of homopolymers and copolymers of vinyl acetate. Commercial production of aqueous emulsion polymers results in products which contain varying amounts of unreacted monomers, for example, residual vinyl acetate, since it is not currently technically feasible to carry these polymerization reactions to 100 percent completion. It is thus desirable to minimize the amount of residual monomers in commercial products (e.g., latices) for several reasons from environmental, regulatory and/or economic points of view.

In U.S. Pat. No. 4,529,753, hereafter the '753 patent, there is described a process for minimizing residual monomer in an aqueous polymeric emulsion. The process involves a simultaneous two-step procedure. The emulsion is subjected to a steam stripping operation with the simultaneous introduction of a free radical generating agent until the residual monomer content is not more than 0.05 percent by weight based on the emulsion.

The present invention provides an improved process over such prior art whereby the residual monomer content can be lowered even further in commercially acceptable batch processing times.

SUMMARY OF THE INVENTION

The present invention provides a process of treating an aqueous polymeric emulsion (i.e., latex) of one or more monomers comprising initially treating the emulsion with a sufficient amount of a free radical generator to thereby reduce the residual monomer content to from about 1500 to about 6000 parts per million (ppm) and preferably from about 1900 to about 3000 ppm and subsequently subjecting the emulsion to vacuum/steam stripping at a pressure, flow rate and time period sufficient to further substantially remove residual monomer, without significantly degrading or destabilizing the emulsion. Increased efficiencies with regard to final residual monomer content are obtained by this stepwise procedure as compared to the simultaneous procedure of the '753 patent. Final values in the range of about 5 ppm, or even lower, to about 500 ppm have been achieved.

DETAILED DESCRIPTION OF THE INVENTION

As used in this specification, the terms "aqueous polymeric emulsion", "steam stripping", "monomer" and "free radical generator" have the same meanings and scope as in the '753 patent, herein incorporated by reference thereto.

"Steam stripping", or steam distillation, is a well known operation in chemical engineering procedures, as is its application at lower pressures (partial vacuum) which serve to lower operating temperatures. Steam stripping is a type of simple distillation where vaporization of the component to be removed is accomplished by injecting live steam directly through the material. By performing this process at reduced pressure, the boiling point of the water in the system is thereby reduced. This in turn minimizes the possibility of latex destabilization and formation of grit and skins on the product. U.S. Pat. No. 4,017,445 exemplifies a process utilizing steam to remove residual vinyl chloride monomer from aqueous polyvinyl chloride dispersions.

Although the process of the present invention is useful in removing residual monomer content from a wide range of homopolymer or copolymer emulsions, as identified in the '753 patent, it is particularly useful in treating aqueous polymeric emulsions wherein the primary monomer constituent is vinyl acetate and the emulsions which are derived from polymers containing at least 50% by weight of vinyl acetate. For purposes of illustration, vinyl acetate is used in further describing the present invention.

The vinyl acetate may be copolymerized with at least one of any conventionally employed comonomers. Suitable comonomers include those selected from the class of ethylene; vinyl chloride; vinyl esters of aliphatic carboxylic acids containing 1-20 carbon atoms; dialkyl esters of maleic and fumaric acid containing 1-8 carbon atoms in each alkyl group; and $C_1$–$C_8$ alkyl acrylates and methacrylates. These comonomers may be present in the emulsion copolymers at levels up to 48% by weight of the total polymer composition. In the case where ethylene is the comonomer, it is generally used in amounts up to about 30% by weight.

Optional crosslinking monomers used herein include N-methylol acrylamide, N-methylol methacrylamide, N-methylol allyl carbamate, iso-butoxy methyl acrylamide and n-butoxy methyl acrylamide. Preferred crosslinking monomers are N-methylol acrylamide as well as a blend of N-methylol acrylamide and acrylamide available from American Cyanamid under the name NMA Special. The crosslinking monomer is generally used at levels of 0.5 to 10%, preferably 1 to 5%, based upon the weight of the polymer.

The polymer may also contain up to 5% by weight acrylamide or methacrylamide.

Optional olefinically-unsaturated carboxylic acids may be used in an emulsion polymer. These include the alkanoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof, in amounts sufficient to provide up to about 4% by weight of monomer units in the final copolymer.

Optionally, polyunsaturated copolymerizable monomers may also be present in small amounts, i.e., up to about 1% by weight. Such comonomers would include those polyolefinically-unsaturated monomers copolymerizable with vinyl acetate, for example, vinyl crotonate, allyl acrylate, allyl methacrylate, diallyl maleate, divinyl adipate, diallyl adipate, diallyl phthalate, ethylene glycol diacrylate, ethylene glycol dimethacrylate, butanediol dimethacrylate, methylene bis-acrylamide, triallyl cyanurate, etc. In addition, certain copolymerizable monomers which assist in the stability of the copolymer emulsion, e.g., sodium vinyl sulfonate, are also useful herein as latex stabilizers. These optionally present monomers, if employed, are added in very low amounts of from 0.1 to about 2% by weight of the monomer mixture.

The emulsions are prepared using conventional batch, semi-batch or semi-continuous emulsion polymerization procedures. Generally, the monomers are polymerized in an aqueous medium in the presence of a redox initiator system and at least one emulsifying agent, each well known in emulsion polymerization.

If a batch process is used, the vinyl acetate and any optional non-functional monomers such as ethylene are suspended in water and are thoroughly agitated while being gradually heated to polymerization temperature. The homogenization period is followed by a polymerization period during which the initiator and functional monomers are added incrementally or continuously. If the slow addition procedure is employed, the vinyl acetate and any optional comonomers are added gradually throughout the polymerization reaction. In either case, the polymerization is performed at conventional temperatures from about 70° to 225° F., preferably from 120° to 175° F., for sufficient time to achieve a low monomer content, e.g., from 0.5 to about 10 hours, preferably from 2 to about 6 hours, to produce a latex having less than 1 percent, preferably less than 0.2 weight percent, free monomer.

In the case of vinyl ester interpolymers containing ethylene, the polymerization procedure is similar to that discussed above except that it is carried out under pressure of 10 to about 130 atmospheres using polymerization procedures taught, for example, in U.S. Pat. Nos. 3,708,388; 3,404,112; 3,380,851 and 4,164,489. In these cases, the ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally, the polymerization is performed at temperatures from 120° to 175° F. and, at these temperatures, ethylene partial pressures from 50 to 1,500, preferably from 250 to 1,000 psig, are sufficient to incorporate from 1 to 30, preferably from 5 to 25, weight percent ethylene in the polymer.

Polymerization redox initiator couples, which are well known in the art, generally comprise an equivalent amount each of an oxidizing agent such as hydrogen peroxide or an organic peroxide, for example, benzoyl peroxide, t-butyl peroxide and the like, mixed with a suitable reducing agent, for example, sodium formaldehyde sulfoxylate, ascorbic acid, sodium metabisulphite and the like. The total redox initiator couple is generally present in an amount from about 0.05 to about 3.0 weight percent, based on the total weight of the emulsion. The redox initiator couple is slow-added during the polymerization.

To control the generation of free radicals, a transition metal often is incorporated into the redox system, and such metals include an iron salt, e.g., ferrous and ferric chloride and ferrous ammonium sulfate. The use of transition metals and levels of addition to form a redox system for polymerization mediums are well-known.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or nonionic surface active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkyphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 5 to 50 moles of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to 10, preferably from about 2 to about 8, weight percent of the monomers used in the polymerization.

The emulsifier used in the polymerization can also be added in its entirety to the initial charge to the polymerization zone or a portion of the emulsifier, e.g., from 25 to 90 percent thereof, can be added continuously or intermittently during polymerization.

Various protective colloids may also be used in addition to the emulsifiers described above. Suitable colloids include polyvinyl alcohol, partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight, based on the total emulsion.

The polymerization reaction is generally continued until the residual vinyl acetate monomer content is below about 3%, preferably about 2%, by weight based on the total emulsion.

On a pilot plant or production scale for purposes of illustration, the finished batch of product is transferred from the production reactor upon completion of the polymerization, at approximately 50° to 75° C., into a vessel such as a vacuum rated tank equipped with an agitator. The vessel should be roughly three times the volume of the batch to allow disengagement of any foam generated by subsequent treatment. Typically, temperatures in the range of about 50°–60° C. are provided by the heat of reaction and external heating is generally not necessary.

Controlled additions of a free radical generator, preferably a redox initiator couple as previously described, along with appropriate mixing times, generally from about 5 to about 30 minutes total, are then utilized until a reduction in the residual monomer content to from about 1500 to about 6000 ppm, preferably from about 1900 to about 3000 ppm, is achieved. In general, from about 0.01 to about 0.25 percent by weight based on the total emulsion is sufficient to achieve such reduction. Standard measurements of periodic samples by gas chromatography during the addition reflect the reduction and its end-point.

The foregoing step of adding the free radical generator is completed prior to commencement of the subsequent vacuum/steam stripping step, which can be demonstrated by the following two methods. The process is carried out at reduced temperature and pressure so as to minimize degradation and destabilization of the latex and hence to minimize the possibility of formation of grit and skins in the product. The process is effective in a temperature range of from about 50° C., at which the corresponding vapor pressure of water is 1.79 psia, to about 80° C., at which the corresponding vapor pressure is 6.87 psia. Steam injection rates are effective at flow rates or the equivalent thereof, in pounds per hour, equal to about 1/30 to 1/15 the batch weight in pounds or the equivalent thereof, or higher.

Method 1 (Preferred)

Precisely controlled vacuum is applied to the tank vessel, set at a selected value of absolute pressure which will determine the boiling point of the water in the system and hence the desired temperature at which the stripping operation is to be carried out. Typically, the procedure is carried out at about 70° to 75° C. and at the absolute pressure corresponding to the boiling point of water at the particular temperature. Operations performed at temperatures ranging about 50° to 80° C. have also been successful.

When the desired pressure is achieved, controlled injection of live steam is started at the bottom of the vessel so as to allow contact of the steam with the emulsion as the steam passes up through the liquid. The agitator runs throughout the process. The rate of steam injection is metered and controlled at a value, in pounds per hour, which is equal to about 1/30th the batch size in pounds. Other rates up to twice this and higher have been used successfully.

At beginning of the steam injection process, the temperature of the latex is lower than the boiling point, since as previously mentioned, the finished latex is generally transferred at approximately 50° to 60° C. Hence, during this phase, the steam condenses in the latex, releasing its latent heat, and serves to elevate the batch temperature. This is the heatup phase which typically takes approximately 20 minutes.

When the batch temperature reaches the boiling point of water at the set pressure, no further temperature rise is evidenced, and the actual stripping is taking place. The vapors given off from the process are directed by pipework at the top of the vessel to the tubeside of a shell and tube type condenser or can be removed by other means, for example, by means of a jet educator. The vapors condense and the resulting liquid drains to a receiver vessel for later disposal.

Steam injection continues for two to four hours from the point when the temperature reaches the boiling point. Samples are taken at the end of each hour and the level of residual monomer is measured by gas chromatography. At the end of the second or third hour the steam injection is stopped and the setpoint of the vacuum controller is lowered to full vacuum. The batch temperature lowers rapidly via vacuum cooling and is approximately 50° C. after about 20 minutes. Final sampling and testing are performed so as to measure the residual level of unreacted monomer. Values in the range of about 50 to about 150 ppm, and sometimes lower, have been achieved with this technique.

Method 2

The finished batch is transferred to the stripping vessel at 70° to 75° C. Vacuum is applied to the vessel in uncontrolled fashion. Normally during the initial application of vacuum a great deal of foam is generated and depending on product type can fill the vessel and the overheads (pipework and condenser) with foam. This tendency to foam can be bad enough to force interruption of the process. This tendency lasts about 30 minutes and then foam generally subsides to a controllable level.

When vacuum reaches the level at which the boiling point of water corresponds to the desired stripping temperature, typically 70° to 75° C., the subsurface steam injection is started. In this method, steam is injected not at a constant rate, but at a rate so as to maintain a constant temperature in the stripping vessel. The use of a temperature sensor and automatic controller tied in with the steam injection valve is essential.

The steam injection is carried out for two to three hours. Hourly samples are taken and checked by gas chromatography for level of residual monomer. At the end of the injection period, the batch is vacuum cooled as in Method 1. Values in the range of about 100 to 500 ppm are achievable with this technique.

Experiments on the following vinyl acetate homopolymer and copolymer aqueous emulsions in accordance with the present invention illustrate the outstanding low levels of residual vinyl acetate monomer in ppm thereby achieved. Results given in ranges indicate more than one batch. Glass transition temperature (Tg) are normally reported only for products containing ethylene. All water contents are reported as percent of finished product weight. All minor (e.g., crosslinking) monomers are reported as percent of weight of major monomers (major monomers always add up to 100%).

TABLE 1

| COMPOSITION | RESIDUAL VA Monomer (ppm) |
| --- | --- |
| 1. An ethylene/vinyl acetate (EVA) copolymer containing approximately 25% ethylene (Eth) and 75% vinyl acetate (VA). Water content is about 45% by weight. Polyvinyl alcohol is used as dispersant. (Tg is −15° C.) | 2–140 |
| 2. An EVA copolymer containing 85% VA and 15% Eth. Approximately 3% (of the weight of major monomers) n-butoxy methyl acrylamide (NBMA) is also incorporated as a crosslinking monomer. Water content is about 49% and Tg is 0° C. | 6–7 |
| 3. A VA polymer containing approximately 3.5% (of weight of vinyl acetate) n-methylol acrylamide (NMA). Water content is about 55%. | 520 |
| 4. A vinyl acetate/butyl acrylate (BA) copolymer containing approximately 3.5% (of weight of major monomers) NMA. Water content is about 55%. | 4 |

TABLE 1-continued

| COMPOSITION | RESIDUAL VA Monomer (ppm) |
|---|---|
| 5. A VA polymer with approximately 0.75% monoethyl maleate copolymer and including 0.6% sodium vinyl sulfonate for stability. Water content is about 53%. | 380 |
| 6. A VA homopolymer stabilized with polyvinyl alcohol. Water content is about 44%. | 10–200 |
| 7. A vinyl acetate homopolymer stabilized with corn dextrin. Water content is about 36%. | 50 |
| 8. An EVA copolymer containing approximately 83% VA and 17% Eth. Polyvinyl alcohol used as stabilizer. Tg is 7° C. and water content is about 41%. | 40 |
| 9. An EVA copolymer containing approximately 81% VA and 19% Eth. Polyvinyl alcohol used as stabilizer. Tg is 0° and water content is about 45%. | 40 |
| 10. An EVA copolymer containing approximately 87% VA and 13% Eth stabilized with corn dextrin. Tg is 9° C. and water content is about 35%. | 20 |
| 11. An EVA copolymer containing approximately 82% VA and 18% Eth. It also contains approximately 5% (of weight of major monomers) NMA as crosslinking monomer. Water content is about 48% and Tg is 0° C. | 10–23 |
| 12. An EVA copolymer containing approximately 76% VA and 24% Eth. It also contains approximately 5% (of weight of major monomers) NMA as crosslinking monomer. Water content is about 48% and Tg is −10° C. | 40 |
| 13. A vinyl acetate polymer containing approximately 3% (of weight of VA) NMA as croselinking monomer. Polyvinyl alcohol used as stabilizer. Water content is about 52%. | 90 |
| 14. A polyvinyl acetate homopolymer stabilized with polyvinyl alcohol. Water content is about 45%. | 260 |
| 15. An EVA copolymer containing approximately 75% VA and 25% Eth stabilized with polyvinyl alcohol. Tg is −15° C. and water content is about 45%. | 100–150 |
| 16. An EVA copolymer containing approximately 85% VA and 15% Eth with approximately 4% (of weight of major monomers) NMA as crosslinking monomer. Tg is 0° C. and water content is about 48%. | 90 |
| 17. An EVA copolymer containing approximately 81% VA and 19% Eth stabilized with polyvinyl alcohol. Tg is 0° C. and water content is about 45%. | 70 |
| 18. An EVA copolymer containing approximately 85% VA and 15% Eth stabilized with polyvinyl alcohol. Tg is 9° C. and water content is about 45% | 84 |

In view of the foregoing, it is evident that the present invention provides a process of treating an aqueous emulsion of one or more monomers (preferably vinyl acetate), at least 80 (preferably at least 90) weight percent of which have been polymerized, composing the separate steps of initially treating the emulsion with a sufficient amount of a free radical generator (preferably a redox system) in an amount and for a time sufficient to reduce the residual monomer content to from about 1500 to about 6000 parts per million (preferably from about 1900 to about 3000 parts per million) and subsequently subjecting the emulsion to steam stripping under vacuum, without significantly degrading or destabilizing the emulsion, to thereby reduce the residual monomer content to from about 5 to about 500 parts per million (preferably from about 5 to about 200 parts per million).

The process of the present invention is not intended to relate to the initial polymerization of the monomer system. The process is generally applicable in a steam stripper subsequent to devolatilization of the latex.

The process of the present invention may also be applied to the latex in the reactor after about 80 percent (preferably 90 percent) of the monomer has been converted to polymer.

The following examples are given to illustrate the present invention, but it will be understood that they are intended to be illustrative only and not limitative of the invention. In the examples, all parts are by weight unless otherwise indicated.

EXAMPLE 1

This example demonstrates the preparation of an ethylene/vinyl acetate (EVA) adhesive base comprising a polyvinyl alcohol stabilized EVA copolymer of about 20% ethylene content, in which the polymerization reaction was carried out to about 2% by weight residual monomer (vinyl acetate) content. The water content of the polymer latex was about 44%.

To an agitated tank, 2200 pounds of water were added. Then 120 pounds polyvinyl alcohol were added with mixing. The mixture was heated to 80° C.; held for 15 minutes and then cooled to 50° C. Thereafter, 14 pounds nonionic surfactant (Trycol 6956) were added with 28 grams of ferrous sulfate. The pH was adjusted to 4.0 to 4.2 using phosphoric acid and the mixture transferred to a high pressure reactor equipped for heating and cooling.

To the reactor were added 2500 pounds of vinyl acetate, the components mixed and the temperature adjusted to 35° C. prior to pressurizing the reactor with ethylene to 520 psi and mixing for 15 minutes. A first solution of 8 pounds of a 50% hydrogen peroxide in 97 pounds water and a second solution of 9 pounds sodium formaldehyde sulfoxylate and 0.5 pounds sodium acetate in 97 pounds water were prepared.

The two separate solutions were added to the reactor at a rate to assure each addition is complete in a period of 2 hours 30 minutes. Additional ethylene can be adding during the reaction, if needed, to provide the required Tg in the final polymer. Since the batch temperature rises rapidly, sufficient cooling was provided to maintain a reaction temperature at about 85° C.

At the end of the 2 hour, 30 minute period, the batch was sampled and tested and the amount of residual unreacted vinyl acetate was found to be approximately 2 to 3%. The reaction process is stopped and the batch transferred to a stripper for additional treatment as described below.

EXAMPLE 2

This example demonstrates the low level of residual monomer achieved according to the present invention.

Prior to transferring the batch from the reactor to the stripper vessel, vacuum was applied to evacuate the stripper. A 5500 pound batch EVA adhesive base prepared according to Example 1 (approximately 2% residual VA monomer) was transferred to the stripper. Pressure in the stripper builds due to residual unreacted ethylene. The stripper vent was opened and the unreacted ethylene vented to atmosphere. Once atmospheric pressure was achieved in the stripper, vacuum was applied to a level of 10 inches of mercury to complete removal of ethylene.

A solution consisting of 0.7 pounds of hydrogen peroxide (50%) in 5.4 pounds of water, and a second solution of 0.7 pounds of sodium formaldehyde sulfoxylate in 5.4 pounds of water, were prepared (redox couple).

After degassing the residual ethylene, the two redox couple solutions were added to the stripper with agitation over about 5 minutes and the batch was sampled. Measured residual VA by gas chromatography was 1900 ppm.

At this point controlled vacuum was applied to the stripper vessel at an absolute pressure of 4.5 psia, and steam injection was started at 200 pounds per hour, and a temperature of approximately 70° C. Vacuum and injection were continued for three hours and distillate was collected continuously. At the three hour mark steam injection was discontinued and full vacuum was applied so as to accomplish vacuum cooling. Fifteen minutes later the temperature was down to 53° C. Vacuum was broken and a sample was taken. Residual vinyl acetate was measured by gas chromatography and reported as 200 ppm.

EXAMPLE 3

This example demonstrates the comparative level of residual monomer achieved according to a simultaneous redox and steam stripping procedure of the prior art.

A 5500 pound batch of the EVA adhesive base prepared according to Example 1 was transferred to the stripper (approximately 2% residual VA). Residual unreacted ethylene was degassed in the normal manner. At this point, vacuum was applied at 4.5 psia and steam injection at 200 pounds per hour with simultaneously addition of the Example 2 redox components over approximately 10-15 minutes. The vacuum and steam injection were continued for a total of 3 hours as in Example 2. Following injection, vacuum was again lowered and the batch was vacuum cooled to approximately 53° C. Vacuum was broken and a sample taken for analysis. Residual vinyl acetate measured by gas chromatography was 600 ppm.

The foregoing examples demonstrate the commercial advantages of the present invention. The result of Example 2 yielded a final product with a residual level (200 ppm) of vinyl acetate monomer (VAM,) one-third of that (600 ppm) afforded in Example 3, even though each utilized a vacuum/steam stripping cycle of a fixed duration.

I claim:

1. A process of treating an aqueous emulsion of one or more monomers, at least 80 weight percent of which have been polymerized, comprising the separate steps of:
   a) initially treating the emulsion with a sufficient amount of a free radical generator in an amount and for a time sufficient to reduce the residual monomer content to from about 1500 to about 6000 parts per million, and
   b) subsequently subjecting the emulsion to steam stripping under vacuum, without significantly degrading or destabilizing the emulsion, to thereby reduce the residual monomer content to from about 5 to about 500 parts per million.

2. A process of claim 1 wherein said monomer is vinyl acetate.

3. A process of claim 1 wherein the reduced residual monomer content in step
   a) is from about 1900 to about 3000 parts per million.

4. A process of claim 1 wherein the residual monomer content of the final product in step
   b) is from about 5 to about 200 parts per million.

5. A process of claim 1 wherein said emulsion has been degassed prior to step (a).

* * * * *